(12) United States Patent
Hendricks

(10) Patent No.: US 10,589,768 B2
(45) Date of Patent: Mar. 17, 2020

(54) ADJUSTABLE STORAGE DEVICES, SYSTEMS AND ASSOCIATED METHODS

(71) Applicant: Shining Sea Trading Company, West Valley City, UT (US)

(72) Inventor: Jared Hendricks, Draper, UT (US)

(73) Assignee: Shining Sea Trading Company, West Valley City, UT (US)

( * ) Notice: Subject to any disclaimer, the term of this patent is extended or adjusted under 35 U.S.C. 154(b) by 0 days.

(21) Appl. No.: 16/445,020

(22) Filed: Jun. 18, 2019

(65) Prior Publication Data

US 2019/0300036 A1 Oct. 3, 2019

Related U.S. Application Data

(63) Continuation of application No. 15/336,674, filed on Oct. 27, 2016, now Pat. No. 10,322,737.

(60) Provisional application No. 62/247,001, filed on Oct. 27, 2015.

(51) Int. Cl.
*A47B 91/00* (2006.01)
*B62B 3/00* (2006.01)
*B65D 25/06* (2006.01)

(52) U.S. Cl.
CPC .............. *B62B 3/006* (2013.01); *B62B 3/005* (2013.01); *B65D 25/06* (2013.01)

(58) Field of Classification Search
CPC ......... F25D 23/069; B65D 5/06; B65D 25/04; B65D 25/06; B65D 25/16
USPC .................................................. 211/41.9, 180
See application file for complete search history.

(56) References Cited

U.S. PATENT DOCUMENTS

| | | | | |
|---|---|---|---|---|
| 2,702,647 A * | 2/1955 | Wesling | ............. | B65D 21/0215 217/18 |
| 3,392,955 A * | 7/1968 | Cole | ...................... | G01G 19/44 248/446 |
| 5,390,815 A * | 2/1995 | Spiegel | .................. | B65D 25/06 206/583 |
| 6,089,685 A * | 7/2000 | Ryan | ...................... | A47B 67/04 312/291 |
| 10,322,737 B2 * | 6/2019 | Hendricks | ............... | B62B 3/006 |
| 2009/0008283 A1 * | 1/2009 | Hendricks | .............. | B25H 3/026 206/419 |
| 2010/0319391 A1 * | 12/2010 | Lim | ...................... | F25D 25/025 62/441 |
| 2014/0312759 A1 * | 10/2014 | Song | ..................... | F25D 25/025 312/405.1 |

(Continued)

Primary Examiner — Matthew W Ing
(74) Attorney, Agent, or Firm — Thorpe North & Western, LLP

(57) ABSTRACT

Devices, systems, and methods for the storage of objects are provided, such as an adjustable storage device for protecting fragile decorative items, which can include a plurality of adjustable rectangular storage compartments arranged in a rectangular array, a first plurality of elongate structures spaced at intervals and oriented parallel to one another, a second plurality of elongate structures spaced at intervals and oriented parallel to one another, wherein the first plurality of elongate structures is oriented perpendicularly to the second plurality of elongate structures to form an opening for each to of the plurality of storage compartments, and a flexible liner disposed across the plurality of storage compartments, wherein the flexible liner extends through each single opening to form sides and a bottom of each storage compartment.

17 Claims, 7 Drawing Sheets

(56) References Cited

U.S. PATENT DOCUMENTS

2016/0264329 A1* 9/2016 Radosta ................ B65D 65/12

* cited by examiner

ADJUSTABLE STORAGE DEVICES, SYSTEMS AND ASSOCIATED METHODS

PRIORITY DATA

The present application is a continuation of U.S. patent application Ser. No. 15/336,674, filed on Oct. 27, 2016, now issued as U.S. Pat. No. 10,322,737, which claims the benefit of U.S. Provisional Patent Application No. 62/247,001, filed on Oct. 27, 2015, each of which is incorporated herein by reference in its entirety.

BACKGROUND

Many items are acquired by individuals, families, business, local governments, and the like, the storage of which can be challenging, depending on the nature and quantity of the items. Decorative items can be particularly challenging, for example, due to their number, fragile nature, and variable sizes. The same is true for collectables, such as figurines, vases, glassware, and the like.

DESCRIPTION OF EMBODIMENTS

Figure 1:
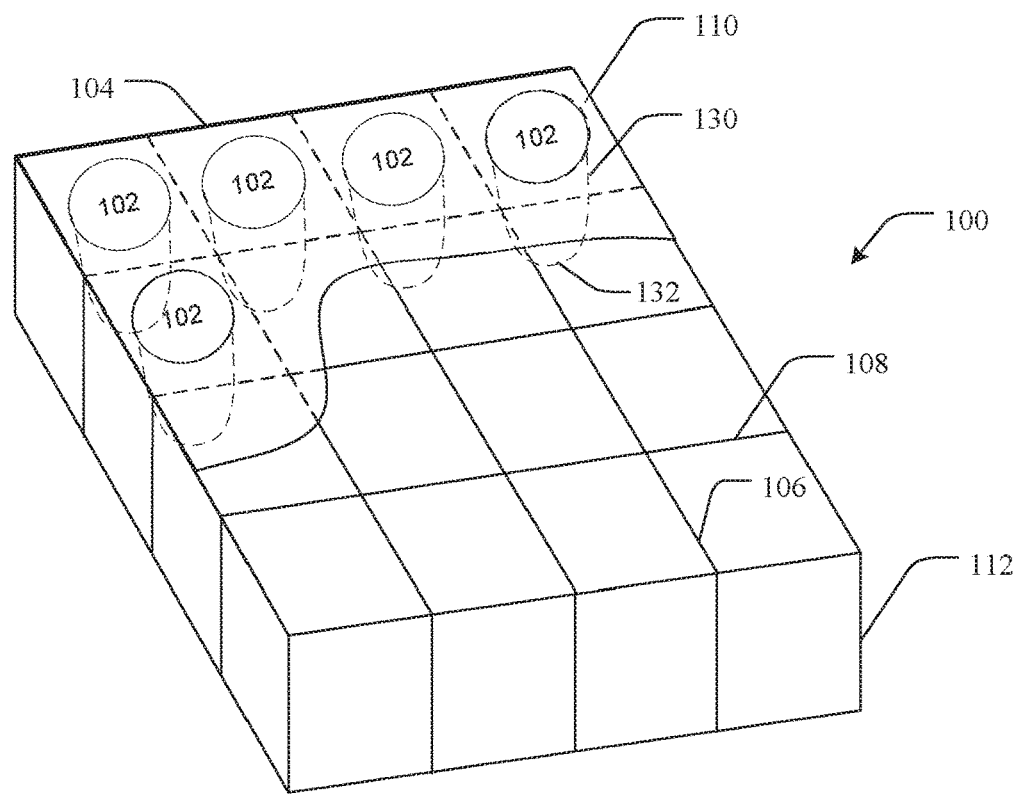
FIG. 1 is a depiction of an adjustable storage device in accordance with an embodiment of the present disclosure.

Although the following detailed description contains many specifics for the purpose of illustration, a person of ordinary skill in the art will appreciate that many variations and alterations to the following details can be made and are considered to be included herein.

Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in this specification, like "comprising" or "including," it is understood that direct support should be afforded also to "consisting essentially of" language as well as "consisting of" language as if stated explicitly and vice versa.

"The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

As used herein, "enhanced," "improved," "performance-enhanced," "upgraded," and the like, when used in connection with the description of a device or process, refers to a characteristic of the device or process that provides measurably better form or function as compared to previously known devices or processes. This applies both to the form and function of individual components in a device or process, as well as to such devices or processes as a whole.

As used herein, "coupled" refers to a relationship of physical connection or attachment between one item and another item, and includes relationships of either direct or indirect connection or attachment. Any number of items can be coupled, such as materials, components, structures, layers, devices, objects, etc.

As used herein, "directly coupled" refers to a relationship of physical connection or attachment between one item and another item where the items have at least one point of direct physical contact or otherwise touch one another. For example, when one layer of material is deposited on or against another layer of material, the layers can be said to be directly coupled.

Objects or structures described herein as being "adjacent to" each other may be in physical contact with each other, in close proximity to each other, or in the same general region or area as each other, as appropriate for the context in which the phrase is used.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Example Embodiments

An initial overview of technology embodiments is provided below and specific technology embodiments are then described in further detail. This initial summary is intended to aid readers in understanding the technology more quickly, but is not intended to identify key or essential technological features, nor is it intended to limit the scope of the claimed subject matter.

The present disclosure relates to devices and systems for storing and protecting items, including associated methods. Any conceivable item can be stored, including both breakable and non-breakable varieties; however, the disclosed devices and systems are particularly suited for the storage and protection of fragile items, such as, for example, fragile decorative items. Examples of fragile decorative items can include, without limitation, holiday ornaments, knickknacks, figurines, crystalline objects, glass objects, and the like, including combinations thereof. Fragile items can be stored in a storage device, or in multiple storage devices coupled together in a storage system. In one example, fragile items can be placed individually into isolated storage compartments that are adjustable in size, and the fragile item is surrounded by a protective liner material.

As is shown in FIG. 1, an adjustable storage device 100 can include a plurality of adjustable rectangular storage compartments 102 arranged in a rectangular array. While FIG. 1 shows a 4×4 rectangular array of storage compartments, such is not limiting, and the present scope includes any size of storage compartment array. The adjustable storage device 100 can also include a peripheral support 104 surrounding the periphery of the rectangular array of storage compartments 102. Multiple first elongate structures 106 are oriented parallel to one another and spaced at intervals across the peripheral support 104 in one direction. Additionally, multiple second elongate structures 108 are oriented parallel to one another and spaced at intervals across the peripheral support 104 perpendicular to the first elongate structures 106. As such, the space delineated where a pair of second elongate structures 108 cross a pair of first elongate structures 106 defines the opening of a storage compartment 102. Storage compartments along the edges and corners are similarly defined, with the exception of the peripheral support 104 along one or more edges. The first and second elongate structures are movable or slidable within the rectangular array, and therefore the size of storage compartments change in size as first and second elongate structures are individually moved.

A flexible liner 110 is disposed across the plurality of storage compartments 102, or in other words, across the peripheral support 104, which extends through each single storage compartment opening to form sides and a bottom of each storage compartment. The flexible liner can be coupled to any structure or surface to which it contacts, provided such coupling does not interfere with the functionality of the storage device. Thus, the liner can be laid across the peripheral support, or the lining can be sewn, clipped, bonded, or otherwise fastened to any portion of the peripheral support, first and/or second elongate structures, bottom support container, or any other element of the device. The liner can be permanently or temporarily attached by any known attachment or fastening mechanism or structure. Non-limiting examples can include clips, buttons, snaps, sewing, adhesives, hook-and-loop devices, and the like, including any other known attachment mechanism. The liner can be made of any conformable material, including, without limitation, both natural and synthetic cloths and fabrics, polymeric materials, rubber materials, neoprene, and the like.

The flexible liner thus hangs down between the storage compartment frame opening formed by the first and second elongate structures. As such, fragile items placed into a storage compartment 102 are protected from damage by the flexible liner 110. In some examples, the bottom portion of the flexible liner in each of the storage compartments is positioned so as to not contact a surface upon which the storage devices resting, or in other words, the flexible liner suspends the fragile items below the storage compartment opening to avoid potentially damaging contact with other structures. The flexible liner moves with the first and second elongate structures and thus conforms to changes in size of each storage compartment.

As one example embodiment, FIG. 1 further includes a bottom support structure 112 to which the first elongate structures 106 and the second elongate structures 108 are coupled. The bottom support structure 112 can have a variety of configurations, such as an enclosed container, a frame, or the like, it can be removably coupled or permanently coupled to the rectangular array of storage compartment openings. Thus, the mechanism for attachment can vary depending on the type of coupling and the device design, and can include various clips, snaps, hook and loop devices, ties, adhesives, sewn connections, and the like. It is noted that in one embodiment, the rectangular array of storage compartment openings is supported by the bottom support structure at a height that precludes contact between the bottom of the flexible lining and a surface upon which the bottom support structure rests during use. In other words, the flexible lining hangs down from the first and second elongate structures to a distance that is less than the height of the bottom support structure.

The peripheral support can vary depending on the design of the adjustable storage device. In some embodiments, an adjustable storage device can include a peripheral support, such as a peripheral support frame, surrounding and supporting the first and second elongate structures and the flexible liner. In other embodiments, an adjustable storage device can be coupled to further support structures, such as, for example, a bottom support structure. In such cases, a peripheral support frame can couple to or rest on the bottom support structure in some embodiments, or in other embodiments the peripheral support is an upper edge of the bottom support structure.

In one embodiment, an adjustable storage device can include a peripheral support frame, a plurality of first parallel elongate structures supported across and slidably coupled to the peripheral support frame, and a plurality of second parallel elongate structures supported across and slidably coupled to the peripheral support frame in a direction substantially perpendicular to the first parallel elongate structures. The first parallel elongate structures and the second parallel elongate structures form a grid pattern having a plurality of openings that adjust in size as the pluralities of first and second parallel elongate structures are moved across the peripheral support frame. The device additionally includes a flexible lining of a conformable material that is applied across the grid pattern and inserted into at least a portion of the plurality of openings to form a plurality of storage spaces or compartments. The lining adjusts along with the size of the openings as the first and second parallel elongate structures are moved with respect to one another.

The various elements described herein can be made from a variety of suitable materials, and the material of construction should not be seen as limiting. Non-limiting examples in general include metals and metal alloys, wood, polymeric materials, rubber materials, ceramics, and the like. In some aspects, one or more elements of a storage device can be 3D printed using typical 3D printing materials such as nylon or a polyamide, for example.

Figure 2:
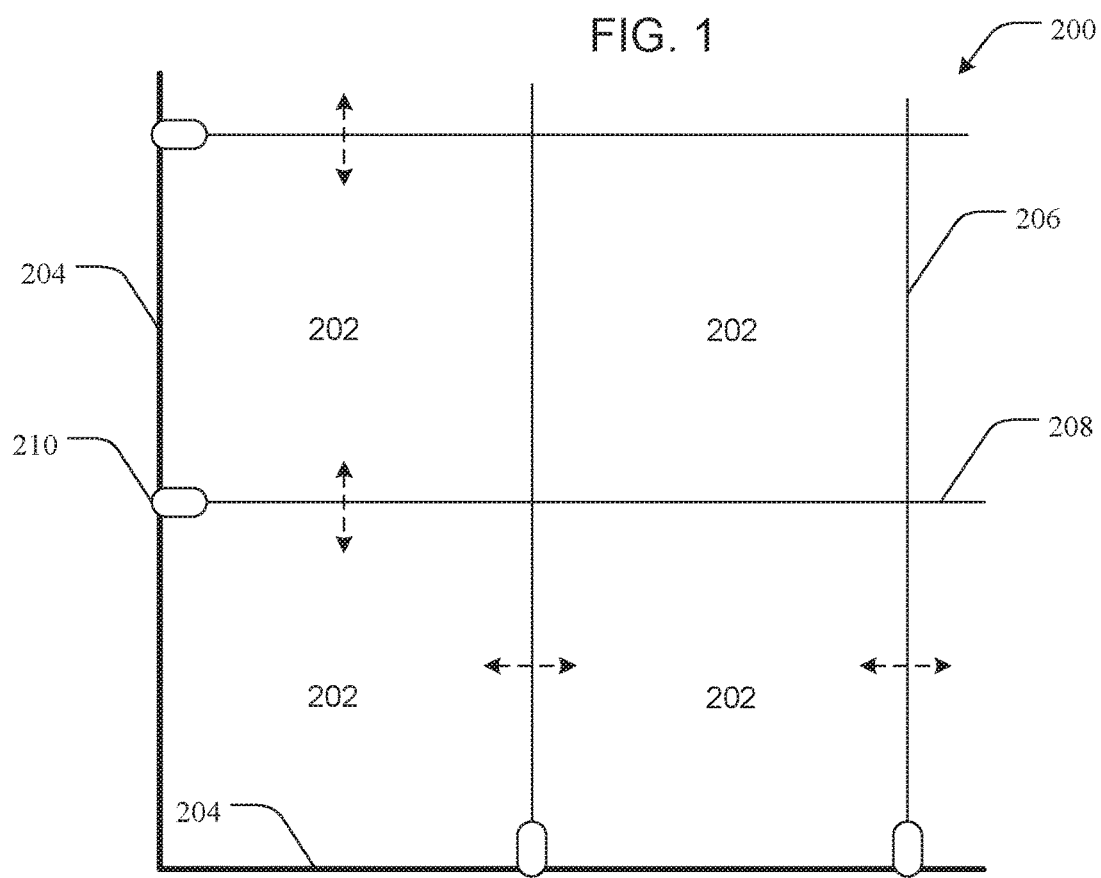
FIG. 2 is a depiction of an adjustable frame of a storage device in accordance with an embodiment of the present disclosure.

FIG. 2 shows one example embodiment of a portion of a rectangular array 200 of storage compartments 202. The rectangular array 200 includes multiple first elongate structures 206 and multiple second elongate structures 208 and slidably attached to and extending across a peripheral support 204. Each first and second elongate structure is coupled to the peripheral support 204 by slidable attachment device 210. The slidable attachment devices 210 allow the first and second elongate structures to slide along their respective sides of the peripheral support 204, thus allowing changes to be made in the size of the storage compartments 202. In one embodiment, the slidable attachment devices, and thus the associated elongate structures, are configured to slide only upon manual operation. As such, the elongate structures are held in place until manually moved by user. In another embodiment, the slidable attachment devices are configured to slide only upon a two-handed manual operation by user.

Figure 3:
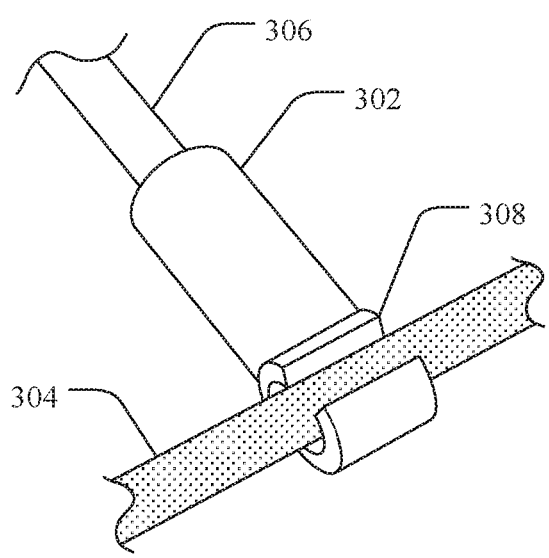
FIG. 3 is a depiction of a coupling device in accordance with an embodiment of the present disclosure.

Numerous techniques and mechanisms are contemplated for use as slidable attachment devices, and any such technique, mechanism, or device capable of coupling elongate structures to a peripheral support frame would be considered to be within the present scope. In one embodiment, as shown in FIG. 3, a nonlimiting example of a friction coupling device 302 is shown. The friction coupling device 302 is shown coupled to the end of a first elongate structure 306. A grasping end 308 of the friction coupling device 302 is slidably coupled to a peripheral support frame 304. The tightness of the grasping end 308 against the peripheral support frame 304 can be adjusted by tightening or crimping the grasping end 308. Other friction coupling devices can be coupled to the ends of the second elongate structures in a similar manner (not shown). In some embodiments, the grasping end of the friction coupling devices coupled to the second elongate structures can be oriented in a top to bottom orientation that is opposite of the friction coupling devices coupled to the first elongate structures. In other words, the grasping end shown in FIG. 3 is coupled to the peripheral support frame in an upward position, so the grasping ends of the friction coupling devices coupled to the second elongate structures can be oriented in a downward position.

Figure 4A:
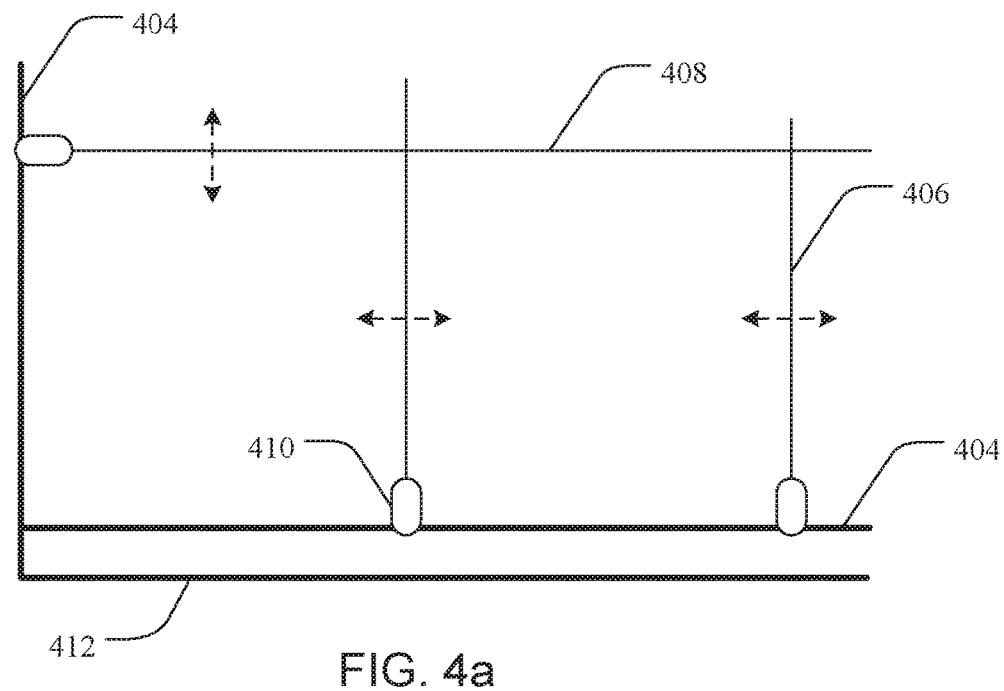
FIG. 4a is a depiction of an adjustable frame of a storage device in accordance with an embodiment of the present disclosure.
Figure 4B:
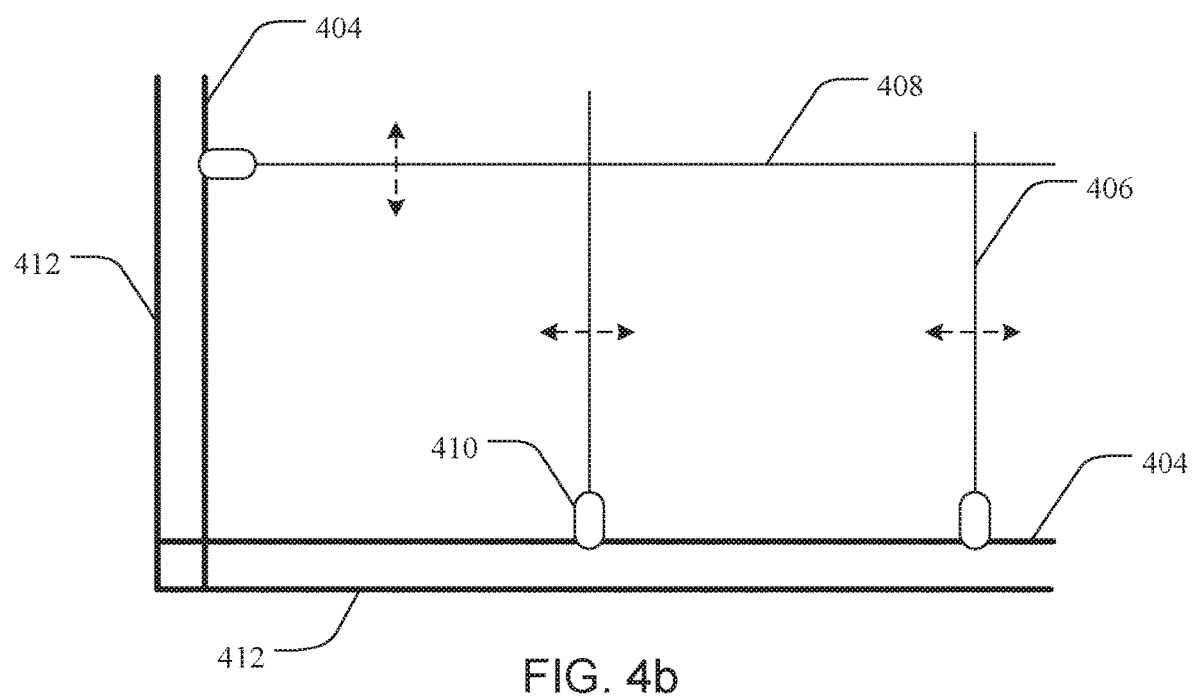
FIG. 4b is a depiction of an adjustable frame of a storage device in accordance with an embodiment of the present disclosure.

In some embodiments, further peripheral structures can be included to, for example, avoid interference between the peripheral support and the slideable elongate structures. As is shown in FIG. 4a, for example, first elongate structures 406 and second elongate structures 408 are slidably coupled to a peripheral frame 404. In this embodiment, a peripheral frame support 412 is aligned in a parallel orientation and coupled to at least one side of the peripheral frame 404. The peripheral frame support thus allows the first elongate structures 406 to slide along the peripheral frame without interference with the bottom support structure. FIG. 4b shows an embodiment similar to FIG. 4a, where the peripheral frame support 412 is aligned along multiple sides of the peripheral frame 404 to also allow the second elongate structures 408 to slide along the peripheral frame without interference with the bottom support structure.

In another example embodiment, a system is provided having multiple adjustable storage devices as has been described. In some embodiments, multiple storage devices can be arranged together and stored as a system. Such a system can include multiple storage devices that are stacked, side-by-side, folded together, or arranged in any manner of configurations. In one embodiment, for example, multiple storage devices can be stacked together in a storage device enclosure or container. The enclosure can be configured to allow the storage devices to lift out, slide out, swing out, or otherwise be made accessible to a user. In some aspects, a storage device can be removed from the enclosure to facilitate the insertion or removal of stored objects, while in other aspects such objects can be removed and inserted while the storage device is coupled to or otherwise within the enclosure.

Figure 5:
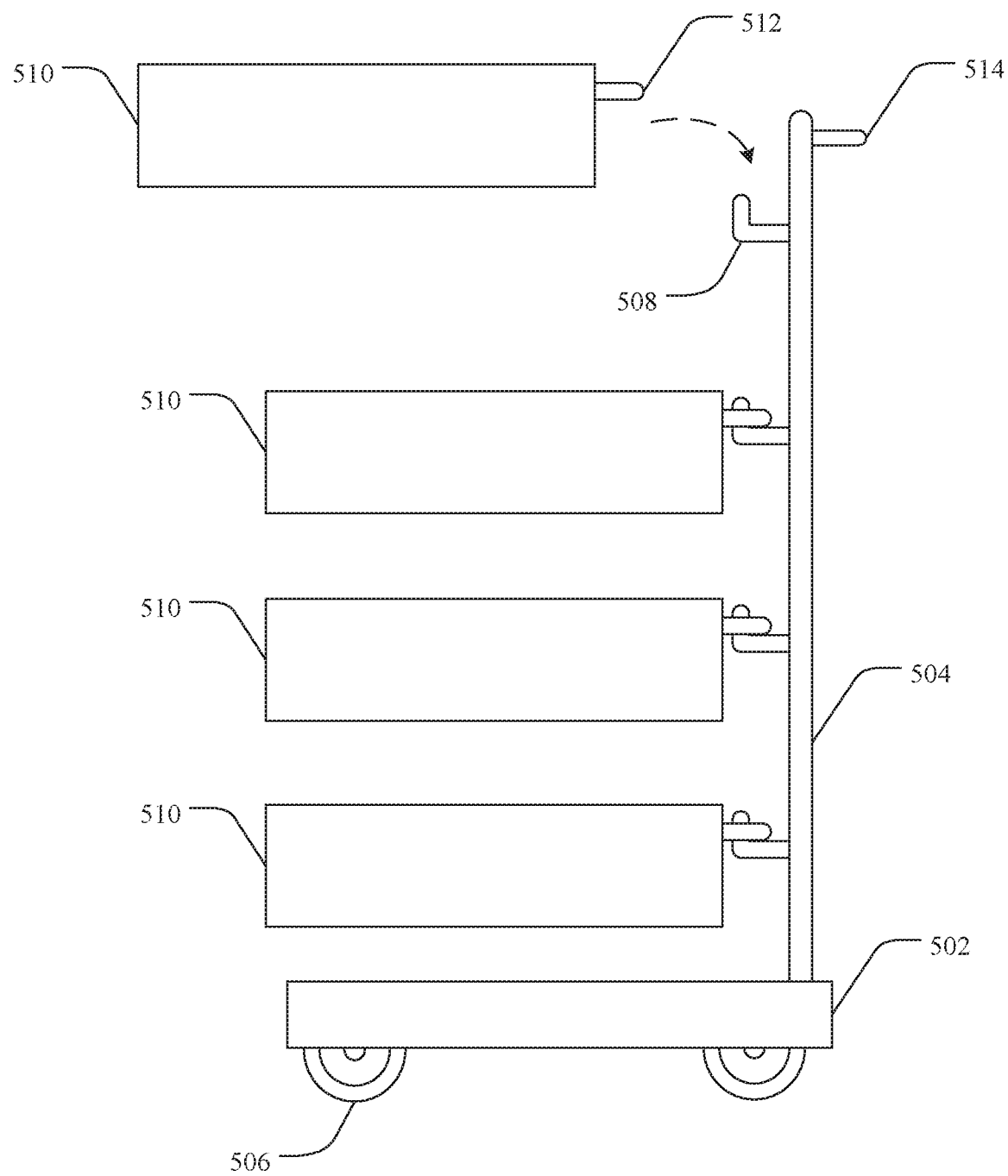
FIG. 5 is a depiction of a storage system in accordance with an embodiment of the present disclosure.

As such, in one embodiment, an adjustable storage system for protecting fragile decorative items can include a storage container and one or more adjustable storage devices as described above disposed in the storage container. In one embodiment, as shown in FIG. 5, a storage container or system can include a base support 502 and a support structure or vertical support structure 504 coupled to the base support 502. The base support can include two or more wheel devices 506 for moving the storage system. The wheel devices 506 can be castors, wheels, or any other rolling device. The base support 502 can include 4 wheel devices as shown in FIG. 5, or two wheel devices positioned proximal to the support structure with one or more resting supports coupled to the base support level the base support when at rest. A plurality of hanging supports 508 are coupled to the support structure 504, and are positioned and configured to couple to and support one or more adjustable storage devices 510. While any attachment device is contemplated, in one embodiment the adjustable storage device 510 includes a U-shaped coupling 512, such as a rod bent into a U-shape, that engages with the hanging support 508 to allow the adjustable storage 510 to cantilever from the support structure 504. Additionally, in some embodiments, the support structure can include one or more handles 514 to facilitate movement of the storage system.

Figure 6A:
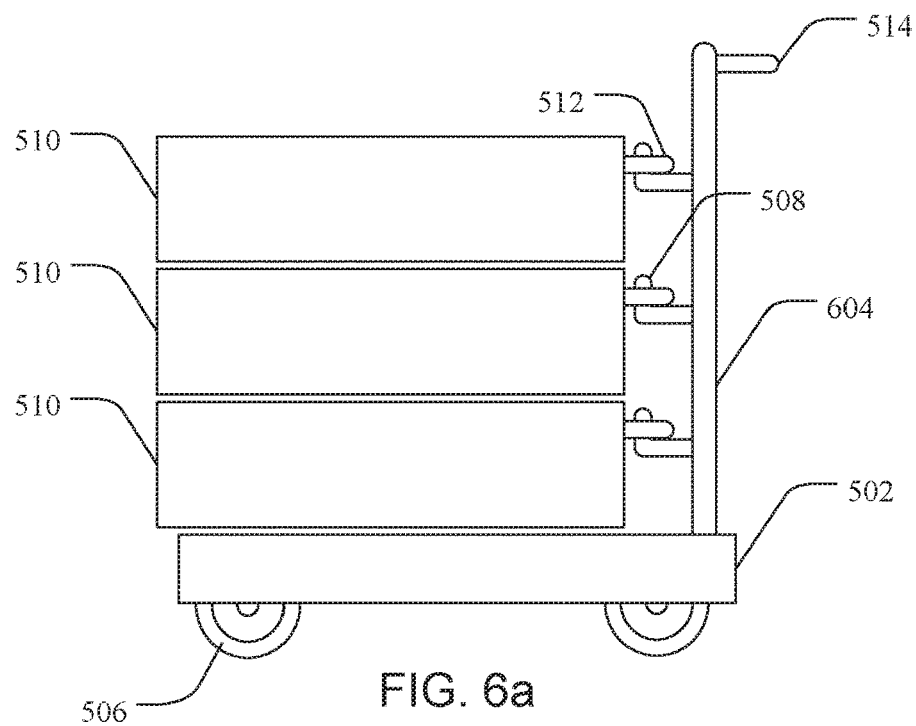
FIG. 6a is a depiction of a storage system in accordance with an embodiment of the present disclosure.
Figure 6B:
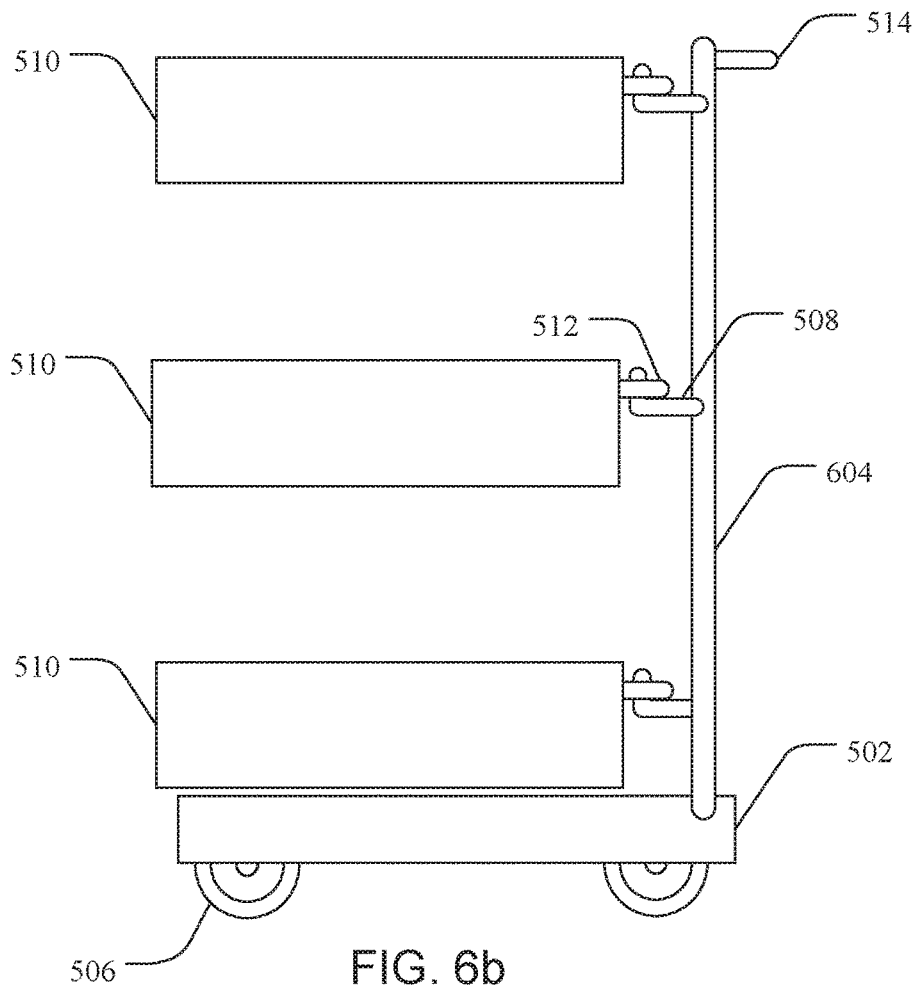
FIG. 6b is a depiction of a storage system in accordance with an embodiment of the present disclosure.

FIGS. 6a,b show another embodiment of a storage system. It is noted that identification numbers that have been reused from previous figures represent structures that are the same or similar, and thus may or may not be discussed with respect to the current figure. FIG. 6a shows a storage system or container having an extendable support structure or vertically-extendable support structure 604 coupled to the base support 502. A plurality of adjustable storage devices 510 are coupled to the extendable support structure 604. FIG. 6b shows the extendable support structure 604 in the extended position, which increases the vertical distance between each of the plurality of adjustable storage devices 510. FIG. 6b shows that the bottom adjustable storage device remains stationary as the extendable support structure 604 is extended. In some embodiments, the bottom-most adjustable storage device can be vertically raised as well.

Figure 7:
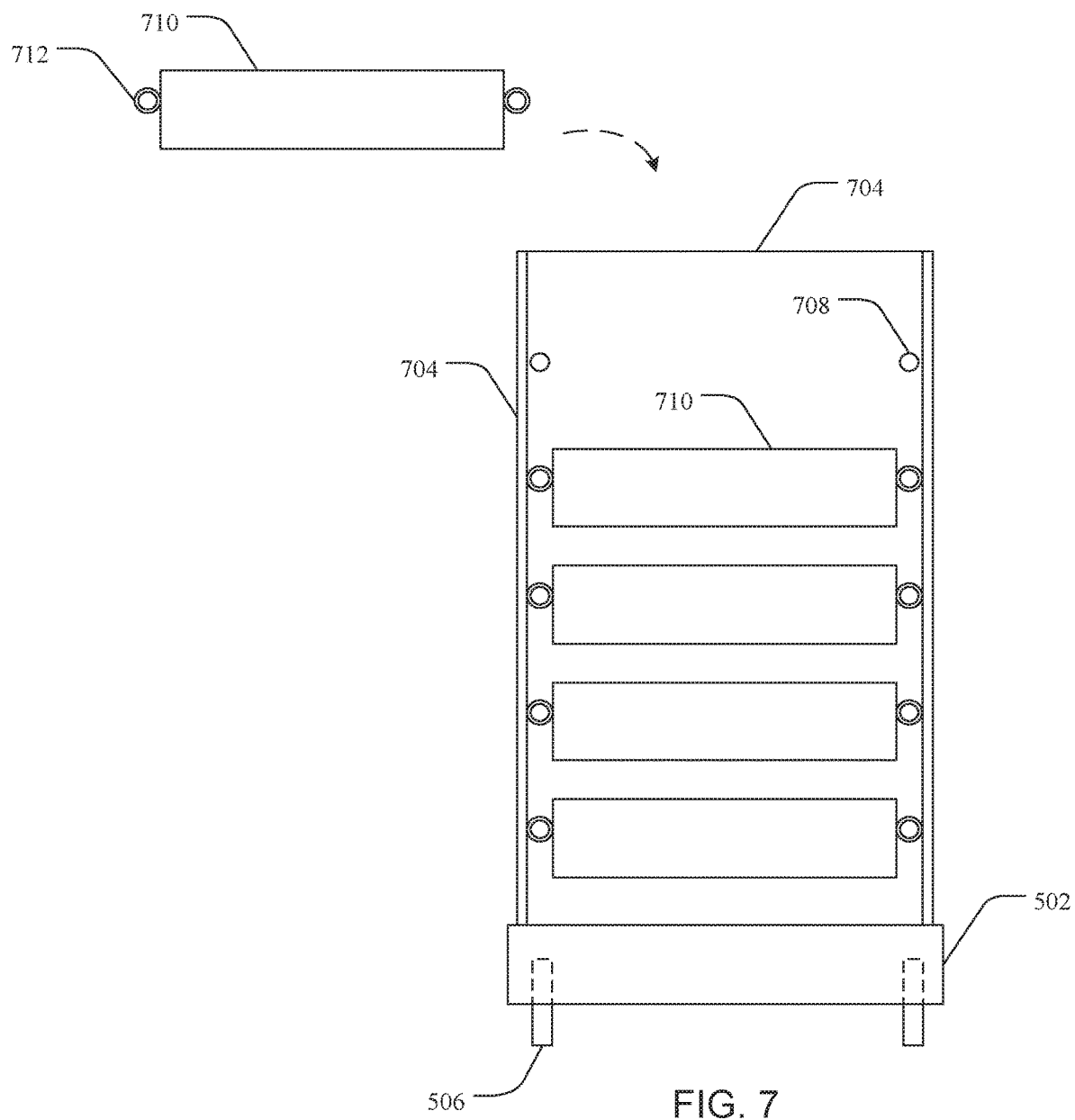
FIG. 7 is a depiction of a storage system in accordance with an embodiment of the present disclosure.

In another embodiment, as is shown in FIG. 7, a storage system is provided including a storage rack (or container) 704, including a plurality of support rods 708 extending from the back side toward the front side, and positioned adjacent to each lateral side of the storage rack 704. A plurality of adjustable storage devices 710 are removably coupled to the support rods 708 and disposed in the storage rack 704. Multiple support tubes 712 are coupled to the adjustable support devices 710, and positioned to be aligned with the support rods 708. Thus, the support tubes of an adjustable storage device are slid onto the support rods of the storage rack to introduce the adjustable storage device there into. Removing an adjustable storage device is accomplished by sliding storage tubes from the storage rods. It is noted that other coupling mechanisms are also contemplated, such as, for example, ledge-type supports coupled to the storage rack that allow a bottom surface of an adjustable storage device to rest there upon.

Figure 8:
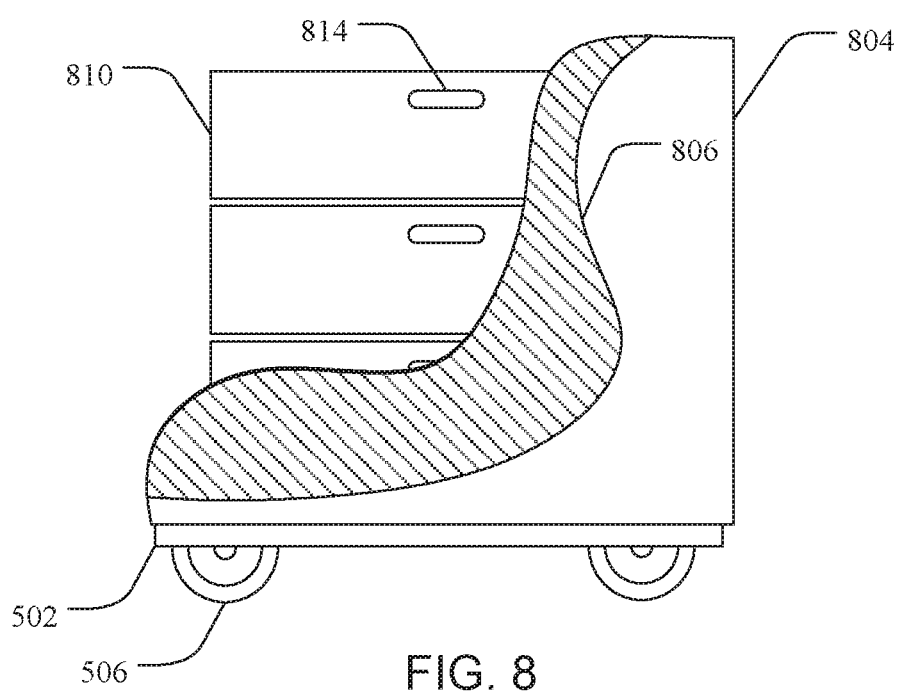
FIG. 8 is a depiction of a storage system in accordance with an embodiment of the present disclosure.

In another embodiment, as is shown in FIG. 8, a storage system can include a bottom support 502 and wheel devices 506, as has been described, coupled to a storage bag or bag material 804. A plurality of adjustable storage devices 810 can be disposed in the storage bag 804, and the storage bag can be closed to provide protection and facilitate movement of the storage system. The storage bag 804 can be opened to access the adjustable storage devices 810, and an inner portion 806 of the storage back 804 can be seen in FIG. 8. The adjustable storage devices 810 can include handles 814 to assist in removing the storage devices from the storage bag. In some embodiments, the storage bag 804 may lack a bottom support 502 and or wheel devices 506 (not shown).

What is claimed is:

1. An adjustable storage device for protecting fragile decorative items, comprising:
    a rectangular peripheral frame;
    a first plurality of adjustable elongate structures spaced at intervals and oriented parallel to one another across opposite sides of the rectangular peripheral frame;
    a second plurality of adjustable elongate structures spaced at intervals and oriented parallel to one another across opposite sides of the rectangular peripheral frame, wherein the first plurality of adjustable elongate structures is oriented perpendicularly to the second plurality of adjustable elongate structures;
    a plurality of central adjustable rectangular storage compartments, each having an opening formed by a pair of the first plurality of adjustable elongate structures and a pair of the second plurality of adjustable elongate structures;
    a first plurality of edge adjustable rectangular storage compartments, each having an opening formed by one of the first plurality of adjustable elongate structures opposite to a side of the rectangular peripheral frame and a pair of the second plurality of adjustable elongate structures;
    a second plurality of edge adjustable rectangular storage compartments, each having an opening formed by one of the second plurality of adjustable elongate structures opposite to a side of the rectangular peripheral frame and a pair of the first plurality of adjustable elongate structures;
    a plurality of corner adjustable rectangular storage compartments, each having an opening formed by one of the first plurality of adjustable elongate structures, one of the second plurality of adjustable elongate structures, and two adjacent sides of the rectangular peripheral frame; and
    a flexible liner disposed across the rectangular peripheral frame, wherein the flexible liner extends through each opening of the plurality of central adjustable rectangular storage compartments, of the first plurality of edge adjustable rectangular storage compartments, of the second plurality of edge adjustable rectangular storage compartments, and of the plurality of corner adjustable rectangular storage compartments, to form sides and a bottom of each storage compartment.

2. The device of claim 1, wherein the first plurality of adjustable elongate structures and the second plurality of adjustable elongate structures are slidably attached to the rectangular peripheral frame.

3. The device of claim 1, further comprising at least one frame attachment structure coupled to the rectangular peripheral frame and operable to secure the rectangular peripheral frame to a storage assembly.

4. The device of claim 3, wherein the at least one frame attachment structure is operable to removably secure the rectangular peripheral frame to the storage assembly.

5. The device of claim 1, further comprising a bottom support structure removably coupled to the rectangular peripheral frame and operable to support the rectangular peripheral frame at a height that precludes contact between the flexible liner and a surface upon which the bottom support structure rests during use.

6. The device of claim 5, wherein the bottom support structure is a storage container enclosing the rectangular peripheral frame.

7. The device of claim 5, further comprising a rectangular peripheral frame support aligned in a parallel orientation and coupled to at least one side of the rectangular peripheral frame, wherein the rectangular peripheral frame support allows at least one of the first plurality of adjustable elongate structures or the second plurality of adjustable elongate structures to slide along the rectangular peripheral frame without interference with the bottom support structure.

8. The device of claim 7, wherein a portion of the rectangular peripheral frame support is aligned along each side of the rectangular peripheral frame in a parallel orientation such that the first plurality of adjustable elongate structures and the second plurality of adjustable elongate structures slide along the rectangular peripheral frame without interference with the bottom support structure.

9. The device of claim 1, wherein the rectangular peripheral frame is an upper edge of a storage container.

10. The device of claim 1, wherein the first plurality of adjustable elongate structures and the second plurality of adjustable elongate structures are configured to slide only upon manual operation.

11. The device of claim 1, wherein the first plurality of adjustable elongate structures and the second plurality of adjustable elongate structures are configured to slide only upon two-handed manual operation.

12. An adjustable storage system for protecting fragile decorative items, comprising:
   a storage container; and
   a plurality of adjustable storage devices as in claim 1 disposed in the storage container.

13. The system of claim 12, further comprising at least two wheel devices coupled to the storage container.

14. The system of claim 12, wherein the storage container is a storage bag.

15. The system of claim 14, further comprising a support structure coupled inside the storage bag that is structurally configured to couple to and support the plurality of adjustable storage devices.

16. The system of claim 15, wherein the support structure is extendable to increase the vertical distance between each of the plurality of adjustable storage devices.

17. The system of claim 12, wherein the storage container is a storage rack.

* * * * *